June 2, 1970  G. J. LISTNER  3,515,687
STERICALLY REARRANGED POLYMERS

Filed July 26, 1967  2 Sheets-Sheet 1

INVENTORS:
GREGORY JULIUS LISTNER
BY John H. Tregoning
ATTORNEY.

Fig. 3.

United States Patent Office 3,515,687
Patented June 2, 1970

3,515,687
STERICALLY REARRANGED POLYMERS
Gregory Julius Listner, Kendall Park, N.J., assignor to Johnson & Johnson, a corporation of New Jersey
Continuation-in-part of application Ser. No. 629,056, Mar. 31, 1967. This application July 26, 1967, Ser. No. 656,110
Int. Cl. C08f 3/02
U.S. Cl. 260—2
17 Claims

ABSTRACT OF THE DISCLOSURE

This application relates to sterically rearranged stereoregular polymers prepared by reacting specific stereoregular polymers with a bromine compound and a free radical initiator.

---

This is a continuation-in-part of application Ser. No. 629,056, filed Mar. 31, 1967.

The art recognizes stereoregular polymers as being polymers that have an ordered structure, i.e., being composed of macromolecules whose monomeric units follow one another along the polymer chain with configurations ordered according to some rule. Of the many such polymers that are thus generally defined, the instant invention is concerned only with specific stereoregular polymers that can be sterically rearranged by the process of this invention.

These specific stereoregular polymers are characterized by being capable of existing in at least two isomer configurations where one or more of these isomers must be noncrystalline either because of the random molecular arrangement of these isomers along the polymer chain or because of its inability to crystallize in short length stereoregular configurations. The specific stereoregular polymer must be oxidizable by hydrogen removal and should preferably have a linear structure. Additionally, such polymer must be amorphous or molten at the temperature range in which both of the essential reactants of the process of the instant invention are reactive, and such polymer must be compatible and capable of being dispersed with these reactants.

Examples of such polymers are polypropylene, polypropylene oxide, poly-1-butene, polyisobutene, polystyrene, polyacrylates, crystalline poly(vinyl) chlorides, poly(vinyl) fluoride, poly-3-methyl-1-butene, poly-4-methyl-1-pentene, poly-4-methyl-1-hexene and poly-5-methyl-1-hexene. These specific stereoregular polymers may exist in isotactic, syndiotactic, heterotactic, diisotactic, disyndiotactic or diheterotactic configurations or as cis or trans isomers. Additionally, combinations of polymers, e.g. copolymers, can be racemized by the process of this invention, when one of the polymers is a specific stereoregular polymer as defined herein and the other polymer(s) satisfies the usual requirements of copolymerization, etc., and where such copolymer is a block polymer.

The present invention provides a method whereby a specific stereoregular polymer is sterically rearranged to provide a polymer characterized by the presence of randioctactic blocks along the polymer chain. This steric rearrangement is controlled such as to provide from at least the detectable presence of randiotactic blocks, i.e., an amount effecting the physical properties of the specific stereoregular polymer, to substantially complete conversion of the specific stereoregular polymer to a randiotactic polymer.

"Randiotactic" as used herein shall mean the sterically rearranged reaction product produced by the result of the process of this invention having been performed on a specific stereoregular polymer. The chemical structure of the randiotactic polymer shall be solely dependent on the chemical structure of the starting specific stereoregular polymer, since the process is that of steric rearrangement; however, in all instances the randiotactic polymer shall be present along the chain of the macromolecule of the sterically rearranged specific stereoregular isomer, as completely randomly distributed blocks or segments, unless, of course, the stereo-rearrangement is complete whereupon the presence of the randiotactic polymer is complete. The randiotactic polymer is characterized by complete solubility or swelling in at least one solvent by being substantially noncrystalline and by having a glass transition temperature usually different than that of the host polymer, since it is defined, essentially, by lengths of isomers derived from the initial, or host, specific stereoregular polymer.

For example, by the process of this invention, areas of the isotactic morphology along the chain of isotactic polypropylene, i.e., a specific stereoregular polymer, are sterically rearranged to blocks or sections substantially wholly defined by short length isotactic, syndiotactic and heterotactic configurations. To explain further and using the polypropylene polymer as the vehicle of such explanation, it is established that with the polypropylene chain depicted in the fully extended planar zigzag configuration, if all the methyl groups lie above (or below) the plane of the main chain, it is termed isotactic, i.e., If all the methyl groups lie alternately above and below the plane, or vice versa, the configuration is syndiotactic, i.e., whereas, if the methyl groups are disposed such that two consecutive methyl groups are up (or down), and the next two consecutive methyl groups are down (or up), the configuration is termed heterotactic, i.e.

The term "randiotactic" or "randiotactic block" which characterizes the configuration of the sterically rearranged or modified blocks or segments of the randiopolymers of the instant invention is defined herein as a macromolecular combination of short length isotactic, syndiotactic and heterotactic polypropylene which is completely soluble in diethyl ether. The existence of the polymer, sterically rearranged according to the process of this invention, is determined by the diethyl ether solubility exhibited by the polymer as a whole. Based upon statistics, the essentially pure randiotactic polymer, i.e., in this instance the polypropylene polymer sterically rearranged by the process of this invention, is hereby defined as having a configuration with an average combination of about 25% isotactic, about 25% syndiotactic and about 50% heterotactic polymer; however, as a practical matter these tactic constituents of the randiotactic segments are present within general ranges such that the heterotactic segment(s) constitutes from about 40% to about 60% of the whole, and the isotactic segment(s) and the syndiotactic segment(s) each constitute from about 20% to about 30% of the whole. These randiotactic blocks are substantially randomly positioned along the polymer chains of the rearranged polymer, and are linked to isotactic blocks or segments of the host polypropylene polymer.

More specifically, this invention provides substantially linear, block polymers of sterically rearranged specific stereoregular polymers, the macromolecules of said block polymers being characterized by possessing randiotactic steric configurations.

The sterically rearranged polymers, i.e., the randiopolymers, of this invention are recognized by a comparison of the physical properties of the starting specific stereoregular polymers, i.e., the host polymers, and those of the sterically rearranged polymer, i.e., the product of the process of this invention as applied to the starting specific stereoregular polymer. The presence of steric rearrangement provided by the instant process, i.e., the presence of randiotactic segments along the polymer chain of the specific stereoregular polymer, is characterized by a decrease in the melting point, the tangential modulus and the tensile strength; however, elasticity and the organic solubility of the polymer are increased. Additionally, the glass transition temperature of the sterically rearranged polymer is usually measurably changed from that of the host polymer. Specific values are dependent on the particular stereoregular polymer hereby sterically rearranged and additional physical differences may well come into being. In all instances, the existence of randiotactic blocks along the chain of the specific stereoregular polymer is detectable by a change in the NMR fingerprint of the host polymer.

Figure 1:
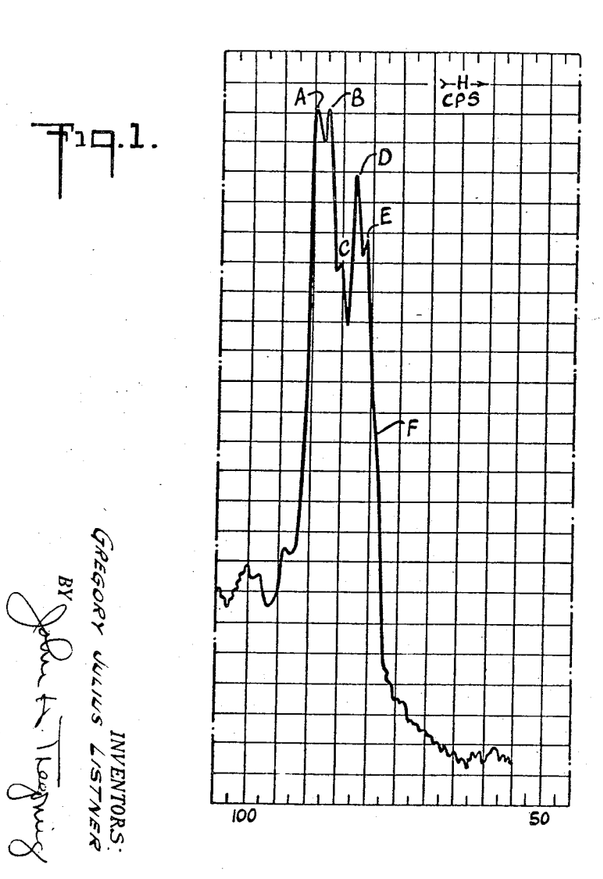
Figure 2:
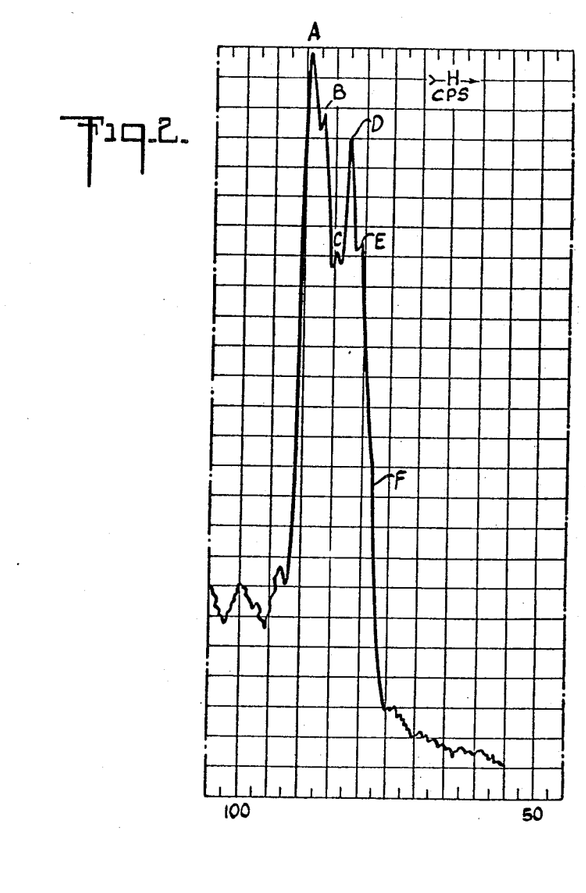

FIGS. 1 and 2 report NMR analysis of the polypropylene isomers produced via Examples X and XVIII, respectively. This analysis was performed utilizing a Varian Associates HA-100, 100 megacycle NMR Spectrometer at a range of 80-90 cycles per second.

The NMR spectra given for both polypropylene isomers exhibit similar peaks even though the isomer tested and reported via FIG. 1 has a corrected diethyl ether solubility of about 50%, and the isomer of FIG. 2 has a diethyl ether solubility of about 75%. The existence of doublets at 89 and 83 c.p.s. (points A and D respectively) report isotactic placement, while doublets at 85 and 79 c.p.s. (points C and F respectively) report syndiotactic placement and doublets at 87 and 81 c.p.s. (points B and E respectively) report heterotactic placement. The area given by the doublets at B and E is always greater by a factor of about two than the area given by the doublets at C and F.

It is well known to those skilled in the art that in polypropylene the amount of isotactic triads are given by doublets 89 and 83 c.p.s. while the amount of heterotactic and syndiotactic are respectively given by the doublets at 87-81 and 85-79. It is also well known to those skilled in the art that the area under the curve representing these doublets is directly proportional to the amount of isotactic, heterotactic and syndioacic triads in the polymer. In order to determine the amount of unconverted isotactic polymer, it is only necessary to subtract from the isotactic doublet the amount of isotactic triads that are present in the stereo-rearranged randiopropylene. The amount of isotactic triads in the randiopropylene can be calculated by using either the amount of syndiotactic triads or one-half the amount of heterotactic triads. Thus, a polymer that has been 40% converted would show 70% of the area between 89 and 79 c.p.s. represented by the doublets shown at 89 and 83 c.p.s., 20% of the area represented by the doublets at 87-81 c.p.s. and 10% of the area represented by the doublets at 85-79 c.p.s. To calculate the amount of isotactic polypropylene that has not been stereo-rearranged the area of the syndioctactic doublet (10%) or one-half the area of the heterotactic doublet (½ × 20%) is subtracted from the area of the isotactic doublet (70%). Thus, it is calculated that 60% of the polypropylene has not been sterically rearranged; therefore, 40% of the original isotactic polypropylene has been sterically arranged and this is the figure used as the NMR degree of conversion.

Polypropylene (a specific stereoregular polymer as defined herein) which has been acted upon by the process of this invention is then defined by a diethyl ether solubility ranging from at least about 1% to about 100% dependent upon the extent of the modification that the starting helical isotactic polypropylene has undergone via the process of this invention. Preferably the sterically rearranged polypropylene polymers are defined by a melting point peak of from about 165° C. to about 50° C. as determined by differential thermal analysis and an isotacticity number, or index, which gives the measure of the amount of original helical isotactic content in the polymer as a whole, of from about 80% to about 15%. However, as the macromolecules, which are completely, or substantially completely racemized increase in number with respect to the whole, the crystallinity, melting point peak, tensile strength and tack temperature of the polymer are each reduced, since the completely, or substantially completely, racemized polypropylene polymers exhibit no crystallinity, low tensile strength, no discernible melting point peak, high elasticity and are tacky below 100° F.

The randiopolymers of this invention are produced by reacting a free radical initiator and a bromine compound with a specific stereoregular polymer.

The specific stereoregular polymer must be in a physical form such as to provide an intimate mixture with the bromine compound and the free radical initiator compound. Desirably, it is in flake or particulate form; however, it should not be so fine as to lose its free-flowing properties. It is desirable that the polymer used be at least of a sufficient particle size so as to not pass through a 100 mesh screen, and preferably coarser, since with smaller particle sizes the free-flowing properties of the resin begin to diminish. Of course, this can be overcome by pelletizing. However, the particle size, desirably, should not become so coarse as to not pass through a 4 mesh screen, since problems with obtaining an intimate polymer blend appear, and the completeness of the desired reaction is thus jeopardized.

The specific stereoregular polymers should be substantially free of stabilizers or other additives reactive with the free radical initiator compound or the organic bromine compound to destroy, or seriously hamper, the intended reaction. Also, since a molecular weight reduction may occur in the reaction of this invention, the initial host polymer resin should preferably have a weight average molecular weight of at least about 100,000.

As used herein, the free radical initiator, which is preferably an organic peroxide, is a chemical compound capable of yielding a free radical, i.e., a radical having an unpaired electron, which will act to initiate the reaction while the starting specific stereoregular polymer resin is in the molten or noncrystalline state. Since the melting point is the temperature at which crystallinity of the host polymer begins to disappear, the organic peroxide must be essentially nonreactive below that temperature. Also, since the free radical initiator compound will decompose to form free radicals, defining it by saying that it must be essentially nonreactive below the melting point of the specific stereoregular polymer is simply to require that if it does decompose below that temperature, the decomposition is slow or minor enough so that there is still a substantial number of free radicals present at the reaction temperature to permit the reaction. Of course, it is preferred that the free radical initiator is completely nonreactive below the melting point of the specific stereoregular polymer.

Additionally, this free radical initiator must liberate free radicals at a temperature where the starting specific stereoregular polymer resin is sufficiently reactive and the racemization reaction is favored over the thermal degradation reaction. This free radical initiator should have sufficient processing stability to permit heating the reactive mass up to the molten temperature of the specific stereogular polymer used to enable it to foster the desired reaction. The free radical initiator should be free of additives, such as antioxidants, that would interfere or compete with or otherwise hamper the reaction.

In the process of this invention, the free radical initiator must be present in an amount such as to provide sufficient "active oxygen" or "active oxygen equivalents" to effect at least about a 20% steric rearrangement or racemization of the specific stereoregulator polymer or at least that amount of free radical initiator which will effect a discernible physical or chemical change in the host polymer.

As used herein, the term "active oxygen" is defined as the amount of oxygen in the free radical initiator that shall react at or above the temperature at which the host polymer, i.e., the specific stereoregulator polymer, is molten or noncrystalline to give free radicals capable of causing removal of the hydrogen radical from a tertiary carbon of one monomeric unit of the host polymer. The term "active oxygen equivalents" shall be defined as a radical capable of abstracting a hydrogen radical from a tertiary carbon of one monomeric unit of the host polymer at or above the temperature at which the host polymer is molten or noncrystalline.

The free radical initator must react at the aforegiven reaction temperature at a sufficient rate to perform its intended function in this process.

Since an intimate contact between the specific stereoregular polymer and the reactants is desired because of the short duration of the reaction and for reasons of uniformity of the reaction product, the free radical initiator must be capable of being substantially uniformly dispersed with the polymer; therefore, it must be in particulate-solid, gaseous or liquid form. A large particle size would be acceptable if the compound became fluid at, or just prior to, reaction temperature.

While this definition of a free radical initiator fits many compounds, an organic peroxide is preferred. Representative examples of free radical initiator compounds defined by the foregoing requirements are dicumyl peroxide, 2,5-dimethyl-2,5-bis (tert-butylperoxy) hexane, 2,5-dimethyl-2,5-bis (tert-butylperoxy) hexyne-3, di (tert-butyl) peroxide, and mixtures of these and other so defined free radical initiators; as for example, where one such free radical initiator will not by itself fully satisfy the requirements given herein for such a compound, but a combination of two or more such free radical initiators as defined herein will satisfy these requirements.

The "bromine compound" is preferably an organic bromine compound which is reactive, i.e. shall release active bromine (where "active bromine" is defined as that portion of the total bromine content of the bromine compound that is, or can be, released at the temperature at which the host polymer is molten or noncrystalline, to provide free bromine radicals), or can be made reactive with proper catalytic systems, in the presence of the free radical initiator at, or above, the temperature at which the host polymer is molten or noncrystalline, and at the temperature where the particular free radical initiator utilized liberates the greatest proportion of its free radicals. Thus, it must be reactive at the same time that the free radical initiator is undergoing substantial free radical liberation. The bromine compound inhibits lowering of the weight average molecular weight.

The bromine compound must be dispersible in, or capable of being made dispersible in, the specific stereoregular polymer under reaction conditions, be nonreactive in the sense that it will not induce or participate in side reactions to detrimentally interfere with the intended reaction. It must also be dispersible, with or without the aid of dispersants, with the host polymer and the free radical compound at the reaction temperature so that intimate contact with these constituents is effected at the time of the reaction.

The bromine compound must contain one or more bromine atoms, one or more of which are capable of being activated by a free radical of the free radical initiator to achieve an active bromine to active oxygen ratio of from about 0.2 to 1, to about 100 to 1 or greater.

The preferred active bromine to active oxygen ratio is 10:1, and, at this ratio certain characteristics physical property changes are effected as the amounts of free radical initiator and the bromine compound are increased. However, certain of these physical properties can be otherwise altered by changing the ratio of bromine to oxygen. This will be discussed later.

Representative examples of the bromine compounds herein defined are tris (2,3-dibromopropyl) phosphate, 1,2 - dibromocyclohexane, $\alpha,\alpha'$ - dibromo - p - xylene, "B52RS," an organic bromine phosphate supplied by Monsanto Chemical Corporation, 1,1,2,2 - tetrabromoethane, 1-bromododecane, 2,3-dibromopropanol, carbon tetrabromide and mixtures of these and other bromine compounds as defined herein.

It is clear that the instant reaction effects a racemization to provide a stereo-rearrangement specific stereoregular polymer; however, to effect this stereoisomerization, the free radical initiator must liberate substantially the greatest number of its free radicals and the bromine compound must be activated at the temperature where the host polymer is converted at least in part to a noncrystalline form. Activation of the organic bromine while the free radical initiator is not liberating any, or at least insufficient, free radicals, may effect bromination of the host polymer. On the other hand, if the free radical initiator is activated and the organic bromine is not, hydrogen may be removed from the specific stereoregular polymer which would cause it to split, and thus not provide the specifically modified polymer of this invention; therefore, it is essential that both the organic bromine and the free radical initiator are present and reactive at the proper temperature. It is desirable that the reaction take place quickly in order that it is most efficient; however, in the event that the half-life of the free radical initiator is short, it is important that the organic bromine be activated substantially completely at the reaction temperature which causes the free radical initiator to release free radicals, in order to insure against chain scission. The degree of rearrangement is dependent on the amount of reactants present and the active bromine to active oxygen ratio, as well as on the temperature at which the reaction is performed.

Preferably the active bromine to active oxygen ratio should be about 10:1 where the former is based on one atom of active bromine per mol of bromine compound and the latter is based on the active oxygen content or active oxygen-equivalent content of the free radical initiator compound. Utilizing this preferred ratio, there is sufficient active bromine present substantially to suppress chain scission of the specific stereoregular polymer which would reduce molecular weight and there is insufficient active bromine present in the process to provide evidence of bromination.

The active bromine to active oxygen ratio utilized is a determinate of certain of the physical property changes that can be effected in host polymer by virtue of the instant process. At, or near, the preferred active bromine to active oxygen ratio of 10:1, there is an increase in organic solubility and elastic recovery values while there is a decrease in melting point and tangential modulus values over these same values defining the starting specific stereoregular polymer. These changes are brought about by the presence of the minimum amounts of free radical initiator with the corresponding presence of the bromine compound dictated by the given ratio in the process of this invention, and the values are further increased or decreased, as the case may be, by increasing the amounts of each constituent in keeping with this given ratio. Thus, utilizing the above ratio of about 10:1 and a minimum value for the by weight active oxygen, there is a lowering of the melting point without a significant change in the other chemical or physical properties of the host polymer.

Increasing the amount of free radical initiator to the preferred minimum amount and utilizing the same active bromine to active oxygen ratio provides a rearranged host polymer exhibiting an increased elasticity, a lower melting point, in some instances a lower glass transition temperature, a reduction in tensile strength, a reduction in density, a reduction in tangential modulus, an increased organic solubility, or swelling, and reduced crystallinity.

As stated earlier, the process of this invention is performed by reacting the specific stereoregular polymer, i.e., the host polymer, with a free radical initiator and a bromine compound; however, the amounts of the latter two compounds that shall be utilized in this racemization is dependent on the temperature at which the host polymer becomes molten or noncrystalline, the amount of active oxygen or active oxygen equivalents (as hereinafter used, the term active oxygen shall read on the term active oxygen equivalents when applicable) in the free radical initator, the amount of active bromine in the bromine compound and the degree of racemization desired. Since these critical properties of all three constituents may vary independently, given minimum amounts of constituents can not be readily recited as applying to all simultaneously. Therefore, the following procedure is necessary to determine the amounts of free radical initiator, and bromine compound that shall be used to effect the instant process.

First, select the specific stereoregular polymer that is to be stereorearranged, determine its melting point or the temperature at which it becomes substantially molten or non-crystalline.

Second, select a free radical initiator which shall have processing stability at least up to the molten temperature of the host polymer and which is capable of releasing sufficient active oxygen in the temperature range at which the host polymer is substantially molten or non-crystalline to achieve racemization. The free radical initiator must have sufficient stability up to that temperature to preclude the premature release of at least the minimum required free radicals necessary to effect polymer stereo-rearrangement. Typical half life tables can be referred to as a guide.

Third, select a reactive bromine compound which has thermal stability at the temperature that the host polymer is molten or noncrystalline, and one that is also sufficiently reactive at the temperature at which the free radical initiator releases sufficient active oxygen to effect the desired degree of host polymer stereorearrangement.

Fourth, select five different levels of active oxygen, i.e., normally between 0.001 and 0.05 percent by weight active oxygen (or active oxygen equivalents). For each value of active oxygen, or X below, and utilizing the following Formula 1, solve for the percent by weight of free radical initiator necessary for each level.

(1)
$$\text{Percent by wt. FRI} = \frac{(K')\left(\frac{\text{Molecular}}{\text{weight of FRI}}\right)(X)}{16\,Y}$$

where

K' is the reaction coefficient for the free radical initiator (assume a value of 1 for K' at this point),
Y is equal to the number of active oxygen atoms in the free radical initiator.

Fifth, utilizing the preferred active bromine to active oxygen ratio of 10:1 (assuming one bromine atom per mol of bromine compound), determine the amount of active bromine required for each X value. Having determined the amount of active bromine, determine the amount of the previously selected bromine compound necessary for each value of X in the reaction.

Sixth, perform each of the reactions utilizing the amounts of free radical initiator and bromine compound that have been calculated. Follow the procedure given in Example II.

Seventh, measure by NMR the tacticity of each of the five randiopolymers produced and calculate the degree of racemization (as shown earlier) for each sample of racemized polymer.

Eighth, plot on log/log paper, where the Y axis is, the percent conversion and the X axis is the grams of active oxygen, the actual percent conversion (as determined by NMR) utilizing the specific calculated active oxygen for each of the samples. After fitting the line, this curve can be used to estimate any degree of conversion, or racemization, of the particular specific stereoregular polymer used to determine the above.

For other variations, i.e., different contact times, reactant amounts, types, etc., this procedure should be repeated to determine any change in degree of conversion or efficiency.

In an approximate procedure, steps seven and eight in the above-given procedure can be replaced by the following; however, the bromine to oxygen ratio (fifth step) need not be consistent and can range from at least about 0.2 to 100 or more, provided, of course, that sufficient active bromine is not released to cause bromination of the host polymer. Onec again the preferred bromine to oxygen ratio is 10:1 based on one atom of bromine per mol of bromine compound.

Seventh, determine the melting point of each of the racemized host polymers and determine the actual percent conversion for each such racemized polymer by the following formula:

(2)
$$\text{Percent conversion} = \frac{\begin{array}{c}\text{Melting}\\\text{point}\\\text{of host}\\\text{polymer}\end{array} - \begin{array}{c}\text{Melting}\\\text{point of}\\\text{racemized}\\\text{polymer}\end{array}}{\text{Melting point of host polymer}} \times 100$$

In this instance the melting point of the racemized polymer is defined as the melting point asymptotically approached as complete conversion is attained.

Eighth, plot on log/log paper, where the Y axis is the percent conversion calculated by Formula 2 and the X axis represents the grams of active oxygen, the approximate percent conversion for each of the racemized samples at the actual value for active oxygen used. Then fit a line (minimizing deviation) between the points plotted. This line gives a good approximation of the degree of racemization obtainable under specific conditions and at various active oxygen levels.

Once again utilizing unstabilized isotactic polypropylene as the specific stereoregular polymer, it is readily determined from the literature that isotactic polypropylene has a melting point at 340° F., a number average molecular weight of 30,000 and has one active hydrogen, i.e., a hydrogen attached to the tertiary carbon, in each mer unit. One hundred grams of this polypropylene shall be used.

The free radical initiator for certain of the racemized samples to be accomplished is dicumyl peroxide which has a half life of 0.9 minute at 340° F., a half life of 6.5 minutes at 300° F., has two active oxygens in each mol and has a molecular weight of 270. 2,5-dimethyl-2,5-di (tertiarybutyl peroxy) hexyne-3 and 2,5-dimethyl-2,5-di (tertiarybutyl peroxy) hexyne are used as the free radical in preparing several other of the racemized samples used.

The bromine compound selected is tris-(2,3-dibromopropyl) phosphate which has a decomposition temperature range of 300°–550° F.; however, it can be processed within this temperature range without significant thermal decomposition.

Referring to Table I (below) which lists seven levels of active oxygen using three different peroxide compounds, reactions were carried out as follows.

The reactions (Examples XXXV–XLI which follow) are performed following the procedure of Example II and germane determinations are made utilizing the second of the preceding procedures. The results are reported in Table I below.

weight active bromine (based on one atom of bromine being activated per mol of the bromine compound).

Most preferably the bromine compound will be present in about 1% by weight and contain 0.1% by weight of active bromine. It is unnecessary to utilize in excess of 10% by weight of organic bromine compound since no additional desirable property changes are effected in the propylene stereoisomer.

It is also important to note the fact that following the process of this invention there is no significant amount of bromine attached, or in evidence, in the sterically rearranged polypropylene produced.

TABLE I

| Example No. | FRI | Percent by wt., FRI | Grams active oxygen | Grams bromine compound | Br-/O- | M.P. of racemized polymers | Percent by wt., stearic acid |
|---|---|---|---|---|---|---|---|
| XXXV | A | .01 | .002 | 3.8 | 217 | 146 | .2 |
| XXXVI | A | .02 | .004 | 3.8 | 109 | 120 | .2 |
| XXXVII | A | .04 | .008 | 3.8 | 54 | 106 | .2 |
| XXXVIII | A | .1 | .02 | 3.8 | 22 | 65 | .2 |
| XXXVIV | B | .1 | .02 | 3.8 | 22 | 63 | .2 |
| XL | C | .1 | .0118 | 4.0 | 38.5 | 58 | 0.5 |
| XLI | C | .2 | .0236 | 4.3 | 21 | 63 | 0.2 |

NOTE.—FRI=Free Radical Initiator:
  (A) 2,5-dimethyl-2,5-di(tertbutyl peroxy) hexyne-3.
  (B) 2,5-dimethyl-2,5-di(tertbutyl peroxy) hexane.
  (C) Dicumyl peroxide.
The bromine compound was tris-(2,3-dibromopropyl) phosphate.

Utilizing Formula 2, percent conversion for the reaction in each of the given examples is determined. Having determined the percent conversion for each of such samples, the percent conversion versus the actual active oxygen used for each of the samples is plotted on full logarithmic 3 x 3 cycle paper and a line is fitted (minimizing deviation) between the points plotted. This plot is given via FIG. 3 which records the fitted line.

Figure 3:
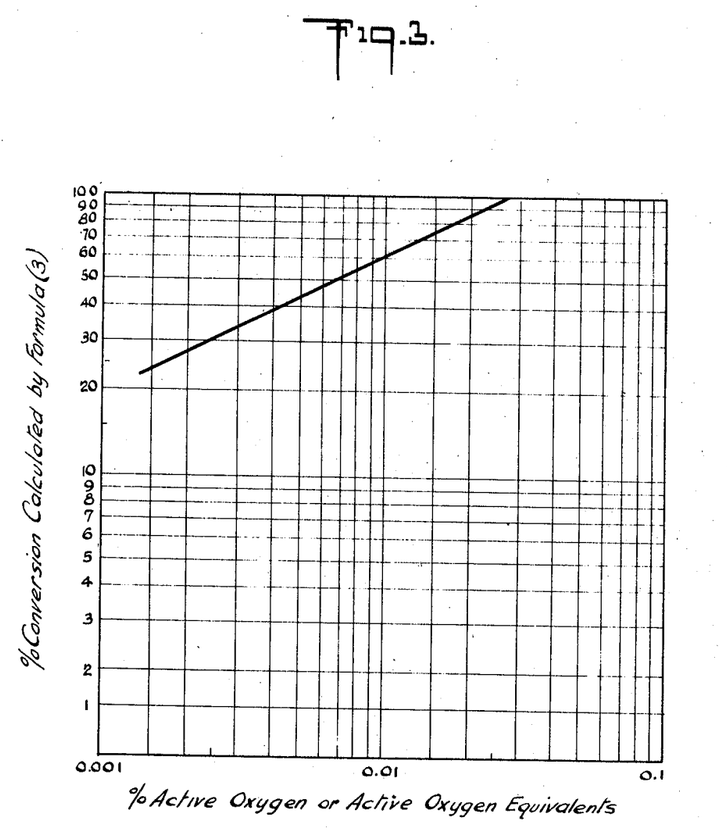

From the graph which is FIG. 3, the approximate conversion which can be expected utilizing a given percent by weight active oxygen, under these specific conditions, can be readily ascertained. From this percent by weight active oxygen, the amount of free radical initiator and bromine compound can also be determined as has been shown.

Utilizing unstabilized isotactic polypropylene as an example of a specific stereoregular polymer once again, the free radical initiator must be present in an amount sufficient to provide an activity equivalent to at least about 0.001% and preferably 0.004% by weight active oxygen at a temperature of from about 325° F. to about 600° F. In the case of polypropylene and when the free radical initiator is an organic peroxide, it has been determined that most such peroxides will satisfy this requirement in the instant process when they are present in an amount of at least about 0.01% by weight and preferably 0.04% by weight based on the total weight.

With respect to polypropylene, the use of up to about 1.5% by weight of free radical initiator organic peroxide, so that the polymer contains up to about 0.2% active oxygen is sufficient in the process of this invention. The use of amounts in excess of 1.5% by weight organic peroxide are economically unsound at about the preferred active bromine to active oxygen ratio since additional benefits are not thereby provided.

The free radical initiator compound can function to lower the weight average molecular weight of the host polymer as much as about 65% but preferably no more than 30%, based on the original molecular weight of the polypropylene polymer during, and as a result of, the reaction of this invention.

Once again utilizing unstabilized isotactic polypropylene as an example of a specific stereoregular polymer, the bromine compound must be present in an amount of at least about 0.04% by weight and preferably about 0.4% by weight so that the polymer reactant mixture has at least about 0.005% by weight and preferably 0.05% by The active bromine to active oxygen ratio utilized is a determinate of certain of the physical property changes that can be effected in the starting stereoregular polymer by virtue of the instant process. At, or near, the preferred active bromine to active oxygen ratio of 10:1, there is an increase in the elastic recovery and solubility values while there is a decrease in melting point and crystallinity over these same values defining the starting polymer.

The molecular weight of the sterically rearranged specific stereoregular polymer is not significantly affected as compared to that of the starting polymer when the preferred ratio of about 10:1 is used even as the amounts of constituent reactants are increased; however, in no event is it decreased an amount in excess of 50%.

As the bromine compound is increased, the values for melting point and crystallinity content respond substantially as they do at the 10:1 ratio; however, the elastic recovery increases at a rate generally greater than the rate in evidence at about the 10:1 ratio, due to plasticization of the stereoisomer formed by the bromine compound. This rate of change, of the elastic recovery, can be accelerated as the amount of bromine compound is increased or as other compatible plasticizers are included. The molecular weight shows no significant change; however, if an excess of active bromine is liberated, i.e., above a ratio of about 10:1, in the reaction, due in part to thermal activation of the bromine, then brominating of the specific stereoregular polymer can occur with an accompanying reduction in molecular weight of up to about 10%.

As the active bromine to active oxygen ratio is decreased the values of melting point and crystalline content respond similarly to these same values at the preferred ratio of active bromine to active oxygen; however, the rate at which elastic recovery increases is reduced as the bromine to oxygen ratio is decreased. At a ratio of about 1:1, the molecular weight will decrease rapidly due to chain scission and below a ratio of about 0.2:1 a desirable commercial product is no longer produced.

The temperature of the instant reaction is dependent on the lowest temperature at which conversion of a crystalline specific stereoregular polymer to noncrystalline begins to take place. The presence of additives necessary, or desired, in the reaction does apparently affect the temperature at which the conversion will occur; therefore, the exact temperature of the first possible reaction is limited somewhat by the contributions of the reactants toward the crystalline-to-amorphous conversion temperature of the polymer. Also, factors such as ambient pressure will modify the temperature at which the polymer begins to lose its crystallinity to become amorphous.

In some instances the presence of certain other additives in the reaction blend is desirable in order to enhance certain properties. For example, a nonreactive dispersant such as stearic acid may be added to the reaction to enhance the blend of constituents. If such a dispersant is utilized, it should preferably be present in an amount of at about from 0.1% and desirably not in excess of about 1.5% by weight. With blends containing an amount of organic bromine and a free radical initiator in excess of about 5%, the use of a dispersant in the above-specified amount is most desirable; however, even with lesser amounts of reactants present, it does aid extrusion and dispersion, and thus contributes to produce a more uniform product.

Certain additives such as coloring pigments, stabilizers, antioxidants, etc., may be added in order to attain specific end results; however, it is desirable that these additives do not react with the polymer or the two primary reactants such as to retard, impede or otherwise hamper or even destroy the essential reaction.

The ingredients may be blended together with the specific stereoregular polymer by thorough blending or mixing, if all components are in finely divided form sufficient to provide an intimate mixture; however, to facilitate the blending of the ingredients, the free radical initiator and the organic bromine plus the dispersant, e.g. stearic acid, if one is used, are preferably premixed using a hot water bath at from about 150° F. to about 200° F. (and preferably not above 175° F.) to form a hot solution which is then added to the specific stereoregular polymer resin in the mixer. If other additives such as carbon, pigments, antioxidants, U.V. stabilizers, etc., are desired in the system, they should be added in concentrated form after the steric rearrangement of the polymer so that they will not interfere with the reaction.

After a thorough mixing for preferably at least about ten minutes, the blend is sufficiently free-flowing to make a feed for an extruder. It is important to note that while typical extrusion reaction conditions are being outlined, the blend can also be reacted by other means which permit rapid heating of the polymer so that activation of the reactants occurs when the polymer is amorphous. This can be accomplished, for example, in a press, a hot air oven, or under infrared heat.

Precaution must be taken in preparing the premix that the free radical initiator and bromine compound premixture is not heated either too long or that the temperature at mixing becomes excessive. If either of these occurrences is allowed, some premature decomposition of the reactants can result and the efficiency of over-all reaction could be reduced.

The reaction time must be such as to permit the stereorearrangement, but not of such duration as to allow polymer degradation and the formation of contaminates. In general, a reaction time exceeding fifteen minutes will facilitate polymer degradation.

In terms of a commercial product, a stabilizer, an antioxidant, an ultraviolet absorber, etc., should be added to provide, in the stereoisomer, a resistance to aging at high temperature (thus a resistance to degradation in standard processing equipment) and to enhance its resistance to weathering and discoloration. These additives are desirably added to the stereoisomer of this invention since they can interfere in varying degrees with the desired reaction, i.e., it is preferred that they are blended into the sterically rearranged randiopolymer, i.e., after the reaction is complete.

The process of this invention produces a randiopolymer which has undergone stereoisomerization to effect at least a specific stereoregular polymer host-randiotactic polymer, and possibly a complete transformation to a randiotactic polymer.

Once again utilizing unstabilized isotactic polypropylene as the specific stereoregular polymer, the process of this invention provides an isotactic-randiotactic polypropylene polymer. Isotactic polypropylene is insoluble in diethyl ether while randiotactic polypropylene is substantially completely soluble in diethyl ether. Thus the fact of the stereoisomerization, with resultant molecular rearrangement to develop randiotactic blocks or segments in the basic isotactic polymer, is evidenced by the development of diethyl ether solubility (or swelling in diethyl ether) in the reaction product which can be varied from about 1% to about 100% solubility. The isotactic-randiotactic polypropylene polymers may also be characterized by improved resistance to high energy radiation and ultraviolet light as opposed to that exhibited by the starting isotactic polypropylene and can be more readily effectively stabilized to resist this energy.

The starting isotactic polypropylene is sterically modified such that its crystallinity is decreased.

With the reduction in crystallinity, properties of the isotactic-randiotactic polypropylene polymer such as tensile strength and density are decreased, while elasticity and elastic recovery are increased. In fact, the physical properties of the polymer can be predictably controlled to conform to certain desired end uses.

The following examples illustrate the manner of using the claimed process of the invention for the preparation of the claimed randiopolymer isomers.

Where measured, the diethyl ether solubility was measured by placing a one gram sample in a Soxhlet Extractor and extracting for six hours with 250 millimeters of diethyl ether. The residue was transferred to an aluminum dish and dried under vacuum overnight at 55° C. The amount of diethyl ether solubility was calculated by determining the weight differences in the sample placed in the Soxhlet Extractor and the sample after drying. The corrected diethyl ether solubility was determined by subtracting from the total ether solubility the amounts of the ingredients, i.e., the organic peroxide, the organic bromine, etc., that had been added to prepare the initial sample.

Elastic recovery was measured using an Instron Model TM instrument. An unoriented extruded filament or a film of the modified polymer was extended 100% using a jaw spacing of four inches, a cross head speed of four inches per minute and a chart speed of eight inches per minute. After the sample had been extended 100%, the load was released and the amount of recovery was reported as the elastic recovery.

Infrared techniques measure the amount of helical isotactic content or crystallinity in the polymers of this invention, to establish that conversion has occurred. The propylene isomers are defined as having an average presence of helical isotactic content in the macromolecule of from about 80% (at about 1% diethyl ether solubility) to about 15% (at 100% diethyl ether solubility). (All infrared data presented herein was obtained using a Perkin-Elmer Model 21 Infrared Spectrophotometer where the polypropylene isotactic content was calculated by comparing the ratio of the areas at 1002 microns to the area at 1027 microns).

The initial tangential modulus was measured using ASTM E-111-61. The test was run using a five-inch jaw spacing, five inches per minute cross head speed and a chart of 50 inches per minute.

Tensile behavior was measured according to ASTM D 1708–59T using microtensile specimens cut from pressed sheet which had been lightly dusted with talc to prevent specimens from sticking during handling.

The molecular weight was determined utilizing a Waters Associate Model 200 Gel Permeation Chromatograph. The solvent was 1,2,4-trichlorobenzene at a temperature of 138° C. with a flow rate of 1 cc. per minute. The sample concentration was ¼% with an injection time of 120 seconds (a 2 milliliters sample). The calibration code used was D & R C–1. The gel columns used were $3 \times 10^6$, $1 \times 10^5$, $3 \times 10^4$ and $3 \times 10^3$ angstroms. The Q value was determined by using values from identical polypropylene samples measured by both gel permeation chromatograph and osmometry.

"Melting point" as used throughout this specification, as for example with respect to the polypropylene stereoisomers of this invention, is the melting point determined by differential thermal analysis using a Model LAXYH recorder-controller; a Model J–2 furnace platform; a Model FIDF furnace and a Model SH–11BR2–ALZ sample holder as manufactured and sold by Robert L. Stone. A 10 mg. sample of the polypropylene isomer is programmed for a 16 C. degrees per minute temperature rise. The melting point temperature is taken at the maximum endothermic peak on the DTA curve. This instrument and this technique measures the melting point of that portion of the polymer that has crystallized.

Unless otherwise specified the percents by weight of the constituents in the reaction are based on the total weight of the constituents.

EXAMPLE I

100% by weight "Profax 6501" isotactic polypropylene, manufactured by Hercules Powder Company and having a particle size such as to pass through a 40 mesh screen and be contained by a 100 mesh screen, is added to a 24:1 L/D extruder utilizing a chrome plated screw with a ⅔ feed section, ⅓ metering and 4.5:1 compression. A 40/100 mesh screen pack is utilized to aid extruding conditions. The temperature in the extruder is 450° F. A monofilament is extruded, quenched in water and tested to determine its physical properties. It has a weight average molecular weight of 214,000, a number average molecular weight of 31,800, a corrected diethyl ether solubility of 0%, a melting point peak at 173° C., an elastic recovery of 7.5%, an infrared isotacticity content of 90% and a tangential modulus of 50,000 p.s.i.

EXAMPLE II 0.02% by weight of the organic peroxide 2,5-dimethyl-2,5-bis(tert-butylperoxy) hexyne-3 and 3.8% by weight of tris-(2,3-dibromopropyl) phosphate together with 0.2% by weight stearic acid are premixed in a hot water bath at a temperature of 160° F. for about ten minutes. This premix is added to 96% by weight finely divided isotactic polypropylene having a particle size that pass through a 40 mesh screen and would be contained by a 100 mesh screen, which is the commercial resin "Profax 6501" sold by Hercules Powder Company. The resultant mixture is thoroughly mixed for a period of about ten minutes or until the blend is very free flowing.

If larger amounts of total reactant additives, i.e., above 8%, are desired, the entire blend can be mixed at about 150° F. to aid absorption of the additives into the resin and to insure free-flowing properties. In that event the isotactic polypropylene resin is heated to about 150° F. separately and then combined with the preheated premixture as described above.

The reaction is carried out in a one inch 24:1 L/D extruder using a chrome plated screw with a ⅔ feed section, ⅓ metering and 4.5:1 compression. a 40/100 mesh screen pack was utilized to aid extruding conditions. The temperature in the extruder was 400° F. The polymer was extruded in monofilament form and quenched in water.

The resultant sterically rearranged polypropylene has a corrected diethyl ether solubility of 2.1%, an isotacticity, determined by infrared, of 65%, a number and weight average molecular weight of 33,600 and 194,000 respectively and an initial tangential modulus of 15,460 p.s.i. Even with an excess of bromine compound in the reaction, the weight average molecular weight of "Profax 6501" isotactic polypropylene is not reduced below about 190,000.

The melting point of the reaction product of this example has a peak at 120° C. whereas the melting point peak of "Profax 6501" polypropylene was 173° C.

The tensile strength of the unoriented reaction monofilament is 6,400 p.s.i. which was determined using ASTM D–412–62–T and it exhibited an elastic recovery of 15%.

EXAMPLE III

The procedure of Example II is followed except 0.10% by weight 2,5-dimethyl-2,5-bis(tert-butylperoxy) hexyne-3, 0.61% by weight tris(2,3-dibromopropyl) phosphate, 0.09% by weight stearic acid and 99.2% by weight "Profax 6501" isotactic polypropylene are used. The corrected diethyl ether solubility of the reaction product is 8%, the elastic recovery is 32% and the tensile strength is 11,700 p.s.i. The initial tangential modulus, isotacticity by infrared and the melting point peak of this polypropylene isomer are 25,300 p.s.i. 54.4% and 106° C. respectively, while the number average molecular weight is 27,700 and the weight average molecular weight is 126,000.

EXAMPLE IV 0.3% by weight of 2,5 - dimethyl-2,5-bis(tert-butylperoxy) hexane, 3.8% by weight tris-(2,3-dibromopropyl) phosphate and 0.2% by weight stearic acid are premixed and added to 95.7% by weight "Profax 6501" polypropylene following the procedure of Example II. The resin blend was extruded following the procedure of Example II. It had a corrected diethyl ether solubility of 59%, an initial tangential modulus of 36 p.s.i., an infrared isotacticity content of 19.5%, a melting point peak at 103° C., a number average molecular weight of 32,800 and a weight average molecular weight of 200,000. It had an elastic recovery of 73% and a tensile strength of 80 p.s.i.

EXAMPLE V

Following the procedure of Example II, 0.5% by weight of dicumyl peroxide, 4% by weight tris-(2,3 - dibromopropyl) phosphate and 0.5% by weight stearic acid are premixed and blended with 95% by weight "Profax 6501" isotactic polypropylene. Monofilaments are extruded having a corrected diethyl ether solubility of 91% and elastic recovery of 25%, a tensile strength of 500 p.s.i. and an initial tangential modulus of 310 p.s.i.

EXAMPLE VI 0.04% by weight 2,5-dimethyl - 2,5 - bis (tert-butylperoxy) hexane, 3.8% by weight tris-(2,3-dibromopropyl) phosphate, 0.2% by weight stearic acid and 96% by weight "Profax 6501" isotactic polypropylene are thoroughly blended at a temperature of 160° F. for a period of ten minutes until the blend is free flowing and then following the extrusion procedure of Example II, monofilaments are extruded and tested. The monofilaments had a corrected diethyl ether solubility of 14.5%, an initial tangential modulus of 6,340 p.s.i., a melting point peak at 60° C., an elastic recovery of 75% and a tensile strength of 6,600 p.s.i.

EXAMPLE VII

Following the procedure of Example VI, 0.2% by weight of 2,5-dimethyl-2,5-bis(tert-butylperoxy) hexyne-3, 4% by weight tris - (2,3 - dibromopropyl) phosphate, 0.2% by weight stearic acid, 2% by weight carbon black concentrate and 93.6% by weight "Profax 6501" isotactic polypropylene are blended and extruded in monofilament form. These monofilaments had a corrected diethyl ether solubility of 19.9%.

EXAMPLE VIII 0.2% by weight dicumyl peroxide, 4.5% by weight 1,2-dibromocyclohexane, 0.5% by weight stearic acid are premixed, blended with 94.8% by weight "Profax 6501" polypropylene and extruded into monofilaments following the procedure of Example II. The resultant monofilament had a corrected diethyl ether solubility of 87.7%, an initial tangential modulus of 582 p.s.i., an elastic recovery of 92% and a tensile strength of 1,100 p.s.i.

EXAMPLE IX 0.2% by weight 2,5-dimethyl-2,5-bis(tert-butylperoxy) hexyne-3, 4% by weight 1,1,2,2-tetrabromoethane, 0.20% by weight stearic acid are premixed, blended with 95.6% by weight "Profax 6501" polypropylene and extruded into monofilaments following the procedure of Example II. The monofilaments had a corrected diethyl ether solubility of 90%.

EXAMPLE X 0.2% by weight dicumyl peroxide, 4.3% tris-(2,3-dibromopropyl) phosphate, 0.5% stearic acid are premixed and blended with 95% "Profax 6501" polypropylene following the procedure of Example II. Following that same procedure, the dry blend is extruded into a rod form. A portion of the rod is banded on a 3 inch x 8 inch differential speed two-roll mill at 220° F. 0.2 part by weight 4,4-thio bis(6-tert-butyl-cresol) in small particle form is added and the mixture masticated for five minutes. Samples 6 inches x 6 inches x 0.045 inch are pressed between polished plates for one minute at 325° F. These sheets are cut into ¾ inch squares and aged in a 325° F. circulating air oven. After three hours, the samples exhibited no sign of tackiness, whereas identical samples not containing the antioxidant were tacky after 15 minutes.

The samples containing the antioxidant have a corrected diethyl ether solubility of 49.1%, an isotacticity content as determined by infrared of 18.1%, a melting point peak at 63° C., a number average molecular weight of 52,000, and a weight average molecular weight of 268,000.

An additional sample is prepared using the same weight percentage of dicumyl peroxide, tris(2,3-dibromopropyl) phosphate, stearic acid and "Profax 6501" polypropylene. This sample is extruded into 25 mil monofilaments following the procedure of Example II. The monofilaments so produced are completely dissolved in orthodichlorobenzene and the resultant viscous liquid is poured over glass wool. Acetone is poured over the orthodichlorobenzene solution and the rearranged polypropylene is precipitated. The precipitated polypropylene is placed into a Soxhlet extractor and solvent extracted with acetone, a known solvent for tris-(2,3-dibromopropyl) phosphate. After extraction the polymer is recovered by dissolving in orthodichlorobenzene. The recovered polymer is analyzed for bromine using X-ray analysis, and it is found to have about 0.05% by weight bromine present. The polymer is reprecipitated, dried and tested, and no significant changes in the physical property values reported earlier in this example are found.

EXAMPLE XI

Following the procedure given in Example X, 0.2% by weight dicumyl peroxide, 4.3% by weight tris-(2,3-dibromopropyl) phosphate, 0.5% by weight stearic acid are premixed, blended with 95% by weight "Profax 6501" isotactic polypropylene and extruded into rods. The extruded rods of stearically modified polypropylene are then chopped and fed into a 1½ inch Modern Plastics' extruder with a 14:1 L/D screw, extruded through a 10 inch wide slit film die casted on a roll and wound up using a rubber squeeze roll. A brown film 30 mils thick exhibiting properties very similar to the sheet or film produced via the procedure of Example X is produced.

EXAMPLE XII

Following the procedure of Example II, monofilaments are prepared utilizing 0.1% by weight dicumyl peroxide, 4% by weight tris-(2,3-dibromopropyl) phosphate and 95.9% by weight "Profax 6501" polypropylene. The monofilaments had a corrected diethyl ether solubility of 15.6%, an initial tangential modulus of 16,400 p.s.i., an elastic recovery of 68% and a tensile strength of 4,900 p.s.i.

EXAMPLE XIII

Following the procedure of Example II, 4% by weight of tris-(2,3-dibromopropyl) phosphate, 0.5% by weight stearic acid and 95.5% by weight "Profax 6501" polypropylene are mixed and extruded into monofilaments. The corrected diethyl ether solubility of the reaction product is about 1%, the isotacticity as determined by infrared is 99%, the elastic recovery is 6% and the tensile strength is 7,700 p.s.i.

EXAMPLE XIV

Following the procedure of Example VI, 0.1% by weight 2,5 - dimethyl-2,5-bis(tert-butylperoxy) hexyne-3 and 99.9% by weight "Profax 6501" polypropylene are blended and extruded into monofilaments. The resultant filaments had a diethyl ether solubility of 0.7%, an initial tangential modulus of 13,900, an isotacticity content determined by infrared of 79%, a melting point peak at 168° C., a tensile strength of 2,400 p.s.i. and the sample failed during testing for elastic recovery. The number average and weight average molecular weight of the filaments are 16,900 and 69,600 respectively.

EXAMPLE XV 0.01% by weight 2,5 - dimethyl-2,5-bis(tert-butylperoxy) hexyne-3, 4% by weight tris(2,3 - dibromopropyl) phosphate and 96% "Profax 6501" polypropylene are premixed, blended and extruded following the procedure of Example II. The resultant monofilaments have a corrected diethyl ether solubility of about 1%, an elastic recovery of 10%, an initial tangential modulus of 17,450 p.s.i., an isotacticity as determined by infrared of 65% and a melting point peak at 150° C.

EXAMPLE XVI 0.1% by weight 2,5-dimethyl-2,5-bis(tert-butylperoxy) hexyne-3, 0.0% by weight tris-(2,3-dibromopropyl) phosphate, 0.5% by weight stearic acid are premixed, blended with about 99.4% by weight "Profax 6501" polypropylene and extruded into monofilaments following the procedure of Example II. The filaments have a corrected diethyl ether solubility of 1.4%, an initial tangential modulus of 68,300 p.s.i., an isotacticity (as determined by infrared) of 63.4%, a melting point peak at 154° C., a number average molecular weight of 20,100 and a weight average molecular weight of 71,300.

EXAMPLE XVII 0.1% by weight 2,5-dimethyl-2,5-bis(tert-butylperoxy) hexyne-3, 3.8% by weight tris-(2,3-dibromopropyl) phosphate, 0.2% stearic acid and 96% "Profax 6501" polypropylene are premixed, blended and extruded into monofilaments following the procedure of Example II. The monofilaments have a corrected diethyl ether solubility of 74.8%, an isotacticity content (as determined by infrared) of 25.5%, a melting point peak at 65° C. and an elastic recovery of 98%.

EXAMPLE XVIII 0.3% by weight dicumyl peroxide, 2% tris-(2,3-dibromopropyl) phosphate, 0.5% stearic acid and 97.2% "Profax 6501" polypropylene are premixed, blended and extruded into monofilaments following the procedure of Example II. The monofilaments have a corrected diethyl ether solubility of 70.3%, a helical isotactic content (as determined by infrared) of 25%, a melting point peak at 65° C., a number average molecular weight of 61,000 and a weight average molecular weight of 248,000.

Two grams of the monofilaments so produced are dissolved in orthodichlorobenzene and the resultant viscous liquid is poured over glass wool. Acetone is poured over the orthodichlorobenzene solution and the rearranged polypropylene is precipitated. The precipitated polypropylene is placed into a Soxhlet extractor and solvent extracted with acetone, a known solvent for tris-(2,3-dibromopropyl) phosphate. After extraction the polymer is recovered by dissolving in orthodichlorobenzene. The recovered polymer is analyzed for bromine using X-ray analysis and it is found to have about 0.01% by weight bromine present. The polymer is reprecipitated, dried and tested, and no significant changes in the physical property values earlier reported in this example are found.

In each example the premixture is blended with sufficient "Profax 6501" polypropylene to insure that the weight percent of the above given bromine compound, dicumyl peroxide, stearic acid plus the particulate polypropylene combine to provide 100% by weight. In each instance the resultant mixture is extruded into monofilament form and quenched in water. Each such resultant polymer is tested as indicated below.

| Example: | Diethyl ether solubility (corrected) | Elastic recovery, percent | Polarized light, microscopic optical crystallinity | Shrinkage at 180° F. of 6:1 oriented filaments, percent | Tack temperature, ° F. | Tensile strength of unoriented filaments, p.s.i. |
|---|---|---|---|---|---|---|
| XXII | 1.0 | 6 | Very large crystals | 3 | 350 | 7,700 |
| XXIII | 1.2 | 6 | ___do___ | 3 | 300 | 7,500 |
| XXIV | 0.7 | 10 | ___do___ | 10 | | 5,000 |
| XXV | 6.2 | 16 | Large crystals | 44 | | 6,700 |
| XXVI | 0.8 | 8 | Small | 6 | 250 | 7,100 |
| XXVII | | 25 | ___do___ | 67 | | 7,700 |
| XXVIII | 7.3 | 30 | Slightly crystalline | 74 | 225 | 6,100 |
| XXIX | 28.3 | 70 | Noncrystalline | 82 | 200 | 4,600 |
| XXX | 57.6 | 76 | ___do___ | 81 | 180 | 4,100 |
| XXXI | 82.9 | 92 | ___do___ | 66 | 150 | 2,200 |
| XXXII | 90.7 | | ___do___ | (1) | 100 | 500 |
| XXXIII | | | ___do___ | (1) | | |

[1] Not orientable.

NOTE.—The material produced via Example XXXIII was extremely elastic and very tacky at room temperature. The tack temperature was less than 100° F.

EXAMPLE XIX 0.01% by weight 2,5-dimethyl-2,5-bis(tert-butylperoxy) hexyne-3, 0.04% by weight tris-(2,3-dibromopropyl) phosphate, 0.002% by weight stearic acid and 99.94% by weight "Profax 6501" polypropylene are premixed, blended and extruded following the procedure of Example II. The monofilaments have a corrected diethyl ether solubility of about 1%, a melting point peak at 163° C. and an elastic recovery of about 9%.

EXAMPLE XX

Following the procedure of Example II, 0.1% by weight 2,5-dimethyl-2,5-bis(tert-butylperoxy) hexyne-3, 0.04% by weight tris-(2,3-dibromopropyl) phosphate, 0.001% by weight stearic acid and 99% by weight "Profax 6501" polypropylene are premixed blended and extruded into monofilaments. These monofilaments have a corrected diethyl ether solubility of 1.2%, a helical isotactic content of 77%, a melting point peak at 159° C. and an elastic recovery of 7%.

EXAMPLE XXI

Following the procedure of Example II, 0.1% by weight dicumyl peroxide, 4% by weight tris-(2,3-dibromopropyl) phosphate, 0.5% by weight stearic acid and 95.4% "Profax 6501" polypropylene are premixed, blended and extruded into monofilaments having a diethyl ether solubility of 24%, an isotacticity as determined by infrared of 44%, and a melting point peak at 58° C.

EXAMPLE XXII

Following the procedure of Example II, 3.8% by weight of tris-(2,3-dibromopropyl) phosphate and 0.2% by weight of stearic acid were premixed with dicumyl peroxide as follows:

| EXAMPLE: | Percent by wt. dicumyl peroxide |
|---|---|
| XXII | 0.00 |
| XXIII | 0.01 |
| XXIV | 0.04 |
| XXV | 0.05 |
| XXVI | 0.06 |
| XXVII | 0.08 |
| XXVIII | 0.1 |
| XXIX | 0.15 |
| XXX | 0.2 |
| XXXI | 0.3 |
| XXXII | 0.5 |
| XXXIII | 1 |

EXAMPLE XXXIV 0.3% by weight 2,5-dimethyl-2,5-bis (tert butyl peroxy) hexane, 3.8% by weight tris-(2,3-dibromopropyl) phosphate, 0.2% by weight stearic acid and 95.7% by weight "Profax 6501" polypropylene are premixed, blended and extruded into monofilaments following the procedure of Example II. The monofilaments have a corrected diethyl ether solubility of 64% and elastic recovery of 73%, a tensile strength of 80 p.s.i. and a tack temperature of less than 100° F.

EXAMPLES XXXV-XL

Following the procedure of Example II, Samples B–G of racemized polypropylene is each prepared utilizing the percent by weight of free radical initiator tris-(2,3-dibromopropyl) phosphate, (bromine compound) and stearic acid given below:

| Example | Sample | Grams FRI | Grams bromine compound | Grams stearic acid | Free radical initiator |
|---|---|---|---|---|---|
| XXXV | B | 0.01 | 3.8 | 0.2 | A |
| XXXVI | C | 0.02 | 3.8 | 0.2 | A |
| XXXVII | D | 0.04 | 3.8 | 0.2 | A |
| XXXVIII | E | 0.1 | 3.8 | 0.2 | A |
| XXXVIV | F | 0.1 | 4.0 | 0.5 | B |
| XL | G | 0.1 | 4.0 | 0.2 | C | where:

A is 2,5-dimethyl-2,5-di (tertiarybutyl peroxy)-hexyne-3,

B is 2,5-dimethyl-2,5-di (tertiarybutylperoxy)-hexane, and

C is dicumyl peroxide.

These samples were utilized for obtaining data used in preparing Table I and FIG. III.

EXAMPLE XLI

Following the procedure of Example II, 0.3 gram of 2,5-dimethyl-2,5-bis (tert-butylperoxy)-hexyne-3; 4 grams of tris-(2,3-dibromopropyl) phosphate; and 0.5 gram of stearic acid are premixed and blended with 85.2 grams of isotactic polystyrene. The resultant mixture is heated in a press between Teflon sheets enclosed in metal plates at a temperature of 520° F. at a pressure of 20,000 p.s.i. The sample still enclosed within the plates, is removed from the press and cooled to 150° F. The sample of polystyrene is then removed from between the Teflon sheets. The tack temperature of the racemized styrene polymeric material was reduced to about 350–370° F. compared with about 420° F. for the unmodified isotactic polystyrene.

This procedure is repeated except that the organic bromine is dibromopropanol. The results are the same.

EXAMPLE XLII

Following the procedure of Example II, 0.3 gram of 2,5-dimethyl-2,5-bis (tert-butylperoxy)-hexyne-3; 4 grams of lauryl bromide and 0.5 gram of stearic acid are premixed and blended with 85.2 grams of poly-4-methyl pentene-1. Monofilaments are extruded at a temperature of 520° F. The melting point of the unmodified host polymer is 238° C. The melting point of the monofilamentary racemized polymeric material is 152° C. where both are determined by differential thermal analysis.

EXAMPLE XLIII 0.3 gram of dicumyl peroxide, 4 grams of tris-(2,3-dibromopropyl) phosphate, 0.5 gram of stearic acid and 85.2 grams of the Rexall polypropylene/polyethylene copolymer designated 67–0314–13A are blended and extruded following the procedure of Example II. The monofilaments are extruded at 450° F. The racemized copolymer had excellent elasticity whereas the host copolymer had negligible elastic recovery.

It will be apparent that many widely different embodiments of this invention may be made without departing from the spirit and scope thereof, and therefore it is not intended to be limited except as indicated in the appended claims.

What is claimed is:

1. A method for preparing a stearically rearranged isotactic-randiotactic polymer characterized by blocks of isotactic polymer and blocks of randiotactic polymer along the polymer chain which comprises reacting an amount of free radical initiator sufficient to provide an activity equivalent to at least about 0.001% by weight of active oxygen and sufficient bromine compound to provide at least about 0.005% by weight active bromine wherein said active bromine and said active oxygen equivalent is present in a ratio of at least about 0.2 to 1, with a specific isotactic polymer at a temperature within the range of from about 325° F. to about 600° F.

2. The method of claim 1 wherein said free radical initiator is an organic peroxide.

3. The method of claim 1 wherein said free radical initiator is dicumyl peroxide.

4. The method of claim 1 wherein said free radical initiator is 2,5-dimethyl-2,5-bis (tert-butylperoxy) hexane.

5. The method of claim 1 wherein said free radical initiator is 2,5 - dimethyl - 2,5 - bis (tert-butylperoxy) hexyne-3.

6. The method of claim 1 wherein the bromine compound is an organic bromine phosphate.

7. The method of claim 1 wherein the bromine compound is tris (2,3-dibromopropyl) phosphate.

8. The method of claim 1 wherein the bromine compound is 1,2-dibromocyclohexane.

9. The method of claim 1 wherein the bromine compound is 1,1,2,2-tetrabromoethane.

10. The method of claim 1 wherein the bromine compound is lauryl bromide.

11. The method of claim 1 wherein the bromine compound is dibromopropanol.

12. A method as defined in claim 1 wherein the active bromine to active oxygen ratio is from about 0.2 to 1 to about 100 to 1.

13. A method as defined in claim 1 wherein the active bromine to active oxygen ratio is approximately 10:1.

14. A method for preparing a stearically rearranged isotactic-randiotactic polymer characterized by blocks of isotactic ploymer and blocks of randiotactic polymer along the polymer chain which comprises reacting an amount of free radical initiator sufficient to provide an activity equivalent to at least about 0.001% by weight of active oxygen and sufficient bromine compound to provide at least about 0.005% by weight active bromine wherein said active bromine and said active oxygen equivalent is present in a ratio of at least about 0.2 to 1, with a specific isotactic polymer at a temperature wherein said isotactic polymer is substantially noncrystalline.

15. The method of claim 14 wherein said free radical initiator is an organic peroxide.

16. The method of claim 14 wherein the bromine compound is an organic bromine phosphate.

17. The method of claim 14 wherein the active bromine to active oxygen ratio is from about 0.2 to 1 to about 100 to 1.

References Cited

Natta: "Stereoregular Polymers and Stereospecific Polymerizations," Chimica e Industria, 39, p. 275 (1957).

JOSEPH L. SCHOFER, Primary Examiner

R. A. GAITHER, Assistant Examiner

U.S. Cl. X.R.

260—89.5, 92.1, 92.8, 93.5, 93.7, 94.8